(12) United States Patent
Yoshimura et al.

(10) Patent No.: US 9,573,464 B2
(45) Date of Patent: Feb. 21, 2017

(54) DIFFERENTIAL DEVICE OF FOUR-WHEEL DRIVE VEHICLE

(71) Applicant: TOYOTA JIDOSHA KABUSHIKI KAISHA, Toyota-shi, Aichi (JP)

(72) Inventors: Takahiro Yoshimura, Toyota (JP); Ryota Horie, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 15/065,529

(22) Filed: Mar. 9, 2016

(65) Prior Publication Data
US 2016/0263995 A1 Sep. 15, 2016

(30) Foreign Application Priority Data
Mar. 13, 2015 (JP) .................... 2015-051439

(51) Int. Cl.
*B60K 17/34* (2006.01)
*B60K 17/346* (2006.01)
(Continued)

(52) U.S. Cl.
CPC ........... *B60K 17/3462* (2013.01); *F16H 48/40* (2013.01); *F16H 48/08* (2013.01)

(58) Field of Classification Search
CPC ................................................. B60K 17/3462
See application file for complete search history.

(56) References Cited

U.S. PATENT DOCUMENTS

| 4,644,823 | A | * | 2/1987 | Mueller | ............. | B60K 17/3462 180/248 |
| 5,083,986 | A | * | 1/1992 | Teraoka | ............. | B60K 17/3462 192/35 |

(Continued)

FOREIGN PATENT DOCUMENTS

| JP | 2015-134597 A | 7/2015 |
| WO | 2010/019641 A2 | 2/2010 |

*Primary Examiner* — Derek D Knight
(74) *Attorney, Agent, or Firm* — Oliff PLC

(57) ABSTRACT

A differential device of a four-wheel drive vehicle which is operated in selected one of a two-wheel drive state in which a drive force from a drive power source is transmitted to left and right main drive wheels and a four-wheel drive state in which a drive force from the drive power source is transmitted to the left and right main drive wheels and left and right auxiliary drive wheels, the differential device including a disconnect mechanism with which a power transmission member for transmitting a drive force only to the auxiliary drive wheels in the four-wheel drive state is separated from the auxiliary drive wheels in the two-wheel drive state, the differential device comprising: a cylindrical ring gear supported rotatably around one rotation axis by a case; a differential case including one and the other cylindrical end portions in a rotation axis direction of the ring gear and supported at the one end portion by the ring gear and at the other end portion by the case rotatably and concentrically with the rotation axis; a sleeve fitted movably in the rotation axis direction in a power transmittable manner on the inner circumferential side of the one end portion of the differential case; and an actuator driving the sleeve via a thrust transmission mechanism between an engagement position at which outer circumferential teeth formed on the sleeve are engaged with inner circumferential teeth formed on the inner circumferential side of the ring gear and a release position at which the teeth are not engaged, the thrust transmission (Continued)

mechanism being at least partially located in a radial space between the ring gear and an axle penetrating the ring gear or a rotation shaft integrally rotating with the axle.

3 Claims, 6 Drawing Sheets

(51) Int. Cl.
*F16H 48/40* (2012.01)
*F16H 48/08* (2006.01)

(56) References Cited

U.S. PATENT DOCUMENTS

| | | | |
|---|---|---|---|
| 5,868,642 A * | 2/1999 | Kobayashi | B60K 17/20 |
| | | | 475/203 |
| 2012/0021864 A1* | 1/2012 | Ziech | B60K 17/16 |
| | | | 475/225 |
| 2015/0165901 A1 | 6/2015 | Tamoto et al. | |
| 2016/0101689 A1* | 4/2016 | Yoshimura | B60K 17/344 |
| | | | 74/665 F |
| 2016/0229405 A1* | 8/2016 | Shimizu | B60K 17/35 |

* cited by examiner

DIFFERENTIAL DEVICE OF FOUR-WHEEL DRIVE VEHICLE

INCORPORATION BY REFERENCE

The disclosure of Japanese Patent Application No 2015-051439 filed on Mar. 13, 2015 including the specification, drawings and abstract is incorporated herein by reference in its entirety.

BACKGROUND OF THE INVENTION

1. Field of the Invention

The present invention relates to a technique related to a configuration of a differential device that is a differential device having a disconnect mechanism with which a power transmission member for transmitting a drive force only to auxiliary drive wheels in a four-wheel drive state is separated (disconnected) from the auxiliary drive wheels in a two-wheel drive state.

2. Description of the Related Art

In a four-wheel drive vehicle in which a selection is made between a two-wheel drive state of transmitting a drive force from a drive power source to left and right main drive wheels and a four-wheel drive state of transmitting a drive force from the drive power source to left and right auxiliary drive wheels in addition to the main drive wheels, a differential device is known that has a disconnect mechanism with which a power transmission member for transmitting a drive force only to the auxiliary drive wheels in the four-wheel drive state is separated from the auxiliary drive wheels in the two-wheel drive state. For example, this corresponds to a differential device described in WO 2010/019641 A2.

The differential device described in WO 2010/019641 A2 has a control coupling (multiplate clutch) disposed on an axle between a differential gear device and one of left and right auxiliary drive wheels, and separates the differential gear device from the one of the left and right auxiliary drive wheels by using the control coupling in the two two-wheel drive state, thereby separating from the auxiliary drive wheels a power transmission member, for example, a propeller shaft for transmitting a drive force only to the auxiliary drive wheels in the four-wheel drive state.

SUMMARY OF THE INVENTION

However, since the differential gear device is separated from one of the left and right auxiliary drive wheels by the control coupling at the time of disconnection when the power transmission member is separated from the auxiliary drive wheels, the differential device as described above has a problem that the differential gear device is put into a fully differential state. The differential gear device does not include a lubrication mechanism on the assumption that rotation of a ring gear rotating together with a differential case of the differential gear device is stopped for a long time during running and results in the fully differential state in which a differential rotation of a pair of side gears is maximized in the differential gear device, and the continuation of such a fully differential state may cause a shortage of lubrication oil for lubricating gears of the differential gear device such as a pair of the side gears and a pair of pinions, leading to concern about a reduction in seize resistance of the gears of the differential gear device. The differential gear device also has a problem that power is transmitted from the auxiliary drive wheels to the power transmission member through a clutch drag by the control coupling, which reduces a disconnect effect of separating the power transmission member from the auxiliary drive wheels.

The present invention was conceived in view of the situations and it is therefore an object of the present invention to provide a differential device preventing a fully differential state of a differential gear device and improving a disconnect effect as compared to conventional devices at the time of disconnection when a power transmission member is separated from auxiliary drive wheels.

To achieve the above object, the principle of the present invention provides a differential device of a four-wheel drive vehicle (a) which is operated in selected one of a two-wheel drive state in which a drive force from a drive power source is transmitted to left and right main drive wheels and a four-wheel drive state in which a drive force from the drive power source is transmitted to said left and right main drive wheels and left and right auxiliary drive wheels, the differential device including a disconnect mechanism with which a power transmission member for transmitting a drive force only to the auxiliary drive wheels in the four-wheel drive state is separated from the auxiliary drive wheels in the two-wheel drive state, the differential device comprising: (b) a cylindrical ring gear supported rotatably around one rotation axis by a case; (c) a differential case including one and the other cylindrical end portions in a rotation axis direction of the ring gear and supported at the one end portion by the ring gear and at said the other end portion by the case rotatably and concentrically with the rotation axis; (d) a sleeve fitted movably in the rotation axis direction in a power transmittable manner on the inner circumferential side of the one end portion of the differential case; and (e) an actuator driving the sleeve via a thrust transmission mechanism between an engagement position at which outer circumferential teeth formed on the sleeve are engaged with inner circumferential teeth formed on the inner circumferential side of the ring gear and a release position at which the teeth are not engaged, (f) the thrust transmission mechanism being at least partially located in a radial space between the ring gear and an axle penetrating the ring gear or a rotation shaft integrally rotating with the axle.

The differential device constructed as described above includes the sleeve fitted movably in the rotation axis direction in a power transmittable manner on the inner circumferential side of the one end portion of the differential case and the actuator driving the sleeve via the thrust transmission mechanism between the engagement position at which the outer circumferential teeth formed on the sleeve are engaged with the inner circumferential teeth formed on the inner circumferential side of the ring gear and the release position at which the teeth are not engaged, and at least a portion of the thrust transmission mechanism is located in the radial space between the ring gear and the axle penetrating the ring gear or the rotation shaft integrally rotating with the axle. Therefore, during a disconnected state in which the power transmission member is separated from the auxiliary drive wheels, the actuator moves the outer circumferential teeth of the sleeve to the release position at which the teeth are not engaged with the inner circumferential teeth formed on the inner circumferential side of the ring gear so as to separate the power transmission path between the ring gear and the differential case and, therefore, the fully differential state of the differential gear device is prevented during the disconnected state and the disconnect effect of separating the power transmission member from the auxiliary drive wheels is enhanced as compared to a differential device using a conventional control coupling (multiplate clutch). The sleeve can be inserted through the inside of the radial space between the ring gear and the axle penetrating the ring gear or the rotation shaft integrally rotating with the axle and fitted on the inner circumferential side of the one end portion of the differential case. As a result, since the sub-assy having the sleeve, the thrust transmission mechanism, and the actuator integrally assembled can be assembled to the main body portion of the differential device having the constituent components such as the ring gear integrally assembled, the constituent components of the differential device such as the sleeve and the actuator can be assembled into a sub-assy. Since the differential case has the one end portion supported by the ring gear and the other end portion supported by the case rotatably and concentrically with the rotation axis, the differential case is located closer to the ring gear as compared to a differential device having, for example, the one end portion and the other end portion supported by the case rotatably and concentrically with the rotation axis in the rotation axis direction, and the size of the differential device is made smaller in the rotation axis direction as compared to the conventional cases, so that the differential device can be reduced in size.

In on preferred form of the invention, (a) a cutout cut in the rotation axis direction is formed in the one end portion of the differential case, and (b) a detection rotor brought into contact with the sleeve and interlocked with movement of the sleeve in the rotation axis direction is disposed non-rotatably relative to the differential case, with a portion of the detection rotor located on the radially outside of the one end portion of the differential case through the cutout. Therefore, since the movement of the sleeve disposed on the inner circumferential side of the ring gear and the inner circumferential side of the one end portion of the differential case moves the detection rotor disposed on the radially outside of the one end portion of the differential case in the rotation axis direction, the connection/disconnection state between the outer circumferential teeth of the sleeve and the inner circumferential teeth of the ring gear is detected by detecting the position of the detection rotor in the rotation axis direction.

In another preferred form of the invention, (a) the detection rotor is a pulse rotor, (b) a rotation sensor is disposed such that the rotation sensor detects a movement position of the pulse rotor in the rotation axis direction, and (c) a connection/disconnection state whether the outer circumferential teeth of the sleeve and the inner circumferential teeth of the ring gear are connected or disconnected is determined based on amplitude of an output signal of the rotation sensor. Therefore, in the sleeve disposed on the inner circumferential side of the ring gear and the inner circumferential side of the one end portion of the differential case, the connection/disconnection state between the outer circumferential teeth of the sleeve and the inner circumferential teeth of the ring gear can be determined by using the highly-reliable rotation sensor.

In a further preferred form of the invention, the thrust transmission mechanism is made up of an auxiliary clutch, a ball cam, a ratchet mechanism and a spring.

In another preferred form of the invention, the actuator is an electromagnetic coil generating a rotation braking torque in the auxiliary clutch to actuate the ball cam.

MODE FOR CARRYING OUT THE INVENTION

An example of the present invention will now be described in detail with reference to the drawings. In the following example, the figures are simplified or deformed as needed and portions are not necessarily precisely drawn in terms of dimension ratio, shape, etc.

Example 1

Figure 1:
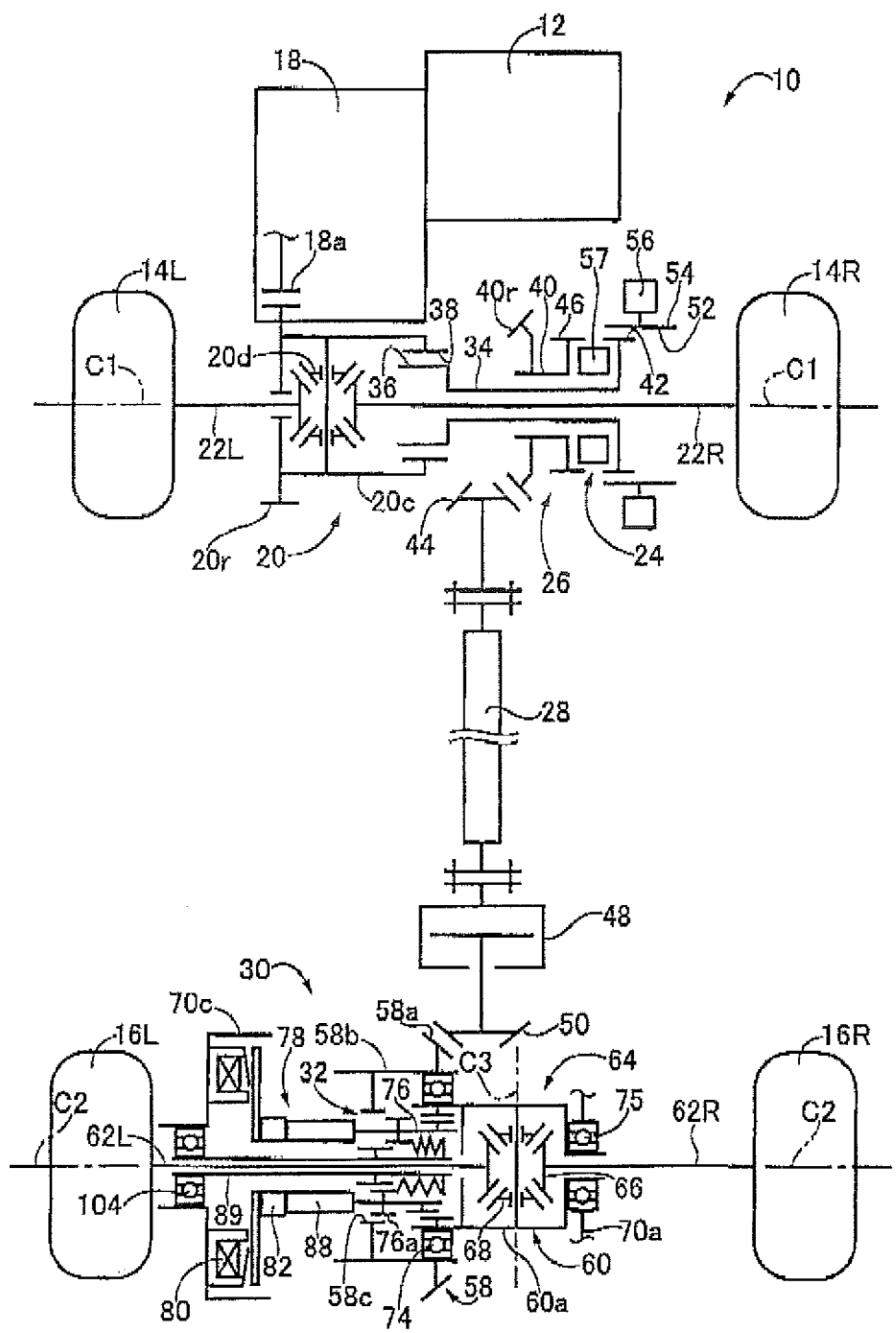
FIG. 1 is a schematic diagram for generally explaining a configuration of a four-wheel drive vehicle to which the present invention is preferably applied.

FIG. 1 is a schematic diagram for generally explaining a configuration of a four-wheel drive vehicle 10 to which the present invention is preferably applied. In FIG. 1, the four-wheel drive vehicle 10 includes an FF-based four-wheel drive device using an engine 12 as a drive power source and having a first power transmission path transmitting power (a drive force) of the engine 12 to left and right front wheels 14L, 14R (referred to as front wheels 14 if not particularly distinguished) corresponding to main drive wheels and a second power transmission path transmitting the power of the engine 12 to left and right rear wheels 16L, 16R (referred to as rear wheels 16 if not particularly distinguished) corresponding to auxiliary drive wheels. In a two-wheel drive state of this four-wheel drive vehicle 10, a drive force transmitted from the engine 12 via an automatic transmission 18 is transmitted through a front-wheel differential unit 20 and left and right axles 22L, 22R to the left and right front wheels 14L, 14R. In this two-wheel drive state, at least a first clutch 24 is released and no power is transmitted to a transfer 26, a propeller shaft (power transmission member) 28, as well as a rear-wheel differential unit (differential device) 30 and the rear wheels 16. However, in a four-wheel drive state, both the first clutch 24 and a second clutch 32 are engaged and a drive force from the engine 12 is transmitted to the transfer 26, the propeller shaft 28, as well as the rear-wheel differential unit 30 and the rear wheels 16 in addition to the two-wheel drive state. Although not shown in FIG. 1, a torque converter acting as a fluid power transmission device or a clutch is disposed between the engine 12 and the automatic transmission 18.

The automatic transmission 18 is made up of, for example, a stepped automatic transmission of a type including a plurality of planetary gear devices and friction engagement devices (clutches, brakes) and selectively engaging the friction engagement devices to select a gear stage. The automatic transmission 18 may be made up of a stepped automatic transmission of a type in which a gear stage of a constant-mesh parallel-shaft transmission is selected by a shift actuator and a select actuator. The automatic transmission 18 may be made up of a stepless transmission of a type in which a gear ratio is continuously varied by changing effective diameters of a pair of variable pulleys having variable effective diameters with a transmission belt wound around the pulleys. The automatic transmission 18 is a known technique and therefore will not be described in terms of specific structure and operation.

The front-wheel differential unit 20 has a ring gear 20r disposed rotatably around a rotation axis C1 and meshed with an output gear 18a of the automatic transmission 18, a differential case 20c fixed to the ring gear 20r, and a differential gear mechanism 20d housed in the differential case 20c, and transmits a drive force to the left and right axles 22L, 22R of the front wheels 14 while allowing differential, rotation between the left and right axles 22L, 22R. The differential case 20c is provided with inner circumferential fitting teeth 38 fitted to outer circumferential fitting teeth 36 formed at an axial end of a first rotation member 34 of the transfer 26. As a result, a portion of the drive force output from the engine 12 is transmitted via the differential case 20c of the front-wheel differential unit 20 to the transfer 26, i.e., the first rotation member 34 of the transfer 26.

The transfer 26 includes the first rotation member 34, a second rotation member 40 provided with a ring gear 40r for transmitting power to the propeller shaft 28, and the first clutch 24 disposed on a power transmission path between the first rotation member 34 and the second rotation member 40. The first clutch 24 is, for example, a meshing type dog clutch (connection-disconnection mechanism) selectively connecting and discontenting the power transmission path between the first rotation member 34 and the second rotation member 40.

The first rotation member 34 is a cylindrical member allowing the axle 22R to penetrate through the inner circumferential side thereof and is disposed rotatably and concentrically with the axle 22R and the second rotation member 40. The outer circumferential fitting teeth 36 are formed at one axial end of the first rotation member 34 and the outer circumferential fitting teeth 36 are fitted to the inner circumferential fitting teeth 38 formed on the differential case 20c, so that the first rotation member 34 rotates integrally with the differential case 20c of the front-wheel differential unit 20. Clutch teeth 42 making up the first clutch 24 are formed at the other axial end portion of the first rotation member 34.

The second rotation member 40 is a cylindrical member allowing the axle 22R and the first rotation member 34 to penetrate through the inner circumferential side thereof. The ring gear 40r meshed with a driven pinion 44 is formed at one axial end portion of the second rotation member 40. Clutch teeth 46 making up the first clutch 24 are formed at the other axial end portion of the second rotation member 40. The driven pinion 44 is connected to an end portion of the propeller shaft 28 closer to the front wheels 14, and a drive pinion 50 is disposed at an end portion of the propeller shaft 28 closer to the rear wheels 16 via a coupling (control coupling) 48 in which a transmitted torque can be controlled by an electronic control device not shown.

The first clutch 24 includes the clutch teeth 42 formed on the first rotation member 34, the clutch teeth 46 formed on the second rotation member 40, and a movable sleeve 54 provided with inner circumferential teeth 52 that are constantly meshed with the clutch teeth 42 of the first rotation member 34 relatively movably in a rotation axis C1 direction, and that can also be meshed with the clutch teeth 46 of the second rotation member 40 by the movement in the rotation axis C1 direction. The transfer 26 includes a first actuator 56 moving the movable sleeve 54 of the first clutch 24 in the rotation axis C1 direction to a meshing position at which the inner circumferential teeth 52 are meshed with the clutch teeth 46 of the second rotation member 40 and to a non-meshing position at which the inner circumferential teeth 52 are not meshed with the clutch teeth 46, respectively. The transfer 26 preferably includes a synchronizing device 57 reducing a relative rotation difference between the inner circumferential teeth 52 and the clutch teeth 46 when the inner circumferential teeth 52 of the movable sleeve 54 are meshed with the clutch teeth 46 in the first clutch 24. FIG. 1 shows a state in which the first clutch 24 is released.

In a power transmission path from the propeller shaft 28 to the left and right rear wheels 16L, 16R, the rear-wheel differential unit 30 includes the second clutch (connection-disconnection mechanism) 32 that is a meshing type dog clutch for selectively connecting and disconnecting the power transmission path between the propeller shaft 28 and the left and right rear wheels 16L, 16R, i.e., between a ring gear 58 relatively non-rotatably meshed with the drive pinion 50 and a differential case 60, and a differential gear device 64 that distributes to the left and right rear wheels 16L, 16R a drive force transmitted from the engine 12 to the differential case 60 in an engaged state of the second clutch 32 while allowing differential rotation between the left and right drive wheels 16L, 16R. The differential gear device 64 has the differential case 60 supported rotatably around a rotation axis C2, a pair of side gears 66 that are respectively coupled to a pair of axles 62L, 62R coupled to the rear wheels 16 and that are supported rotatably around the rotation axis C2 by the differential case 60 such that the side gears 66 face each other in the differential case 60, and a pair of pinions 68 supported rotatably around a rotation axis C3 orthogonal to the rotation axis C2 by the differential case 60. The differential gear device 64 is a known technique and therefore will not be described in terms of specific structure and operation.

Figure 2:
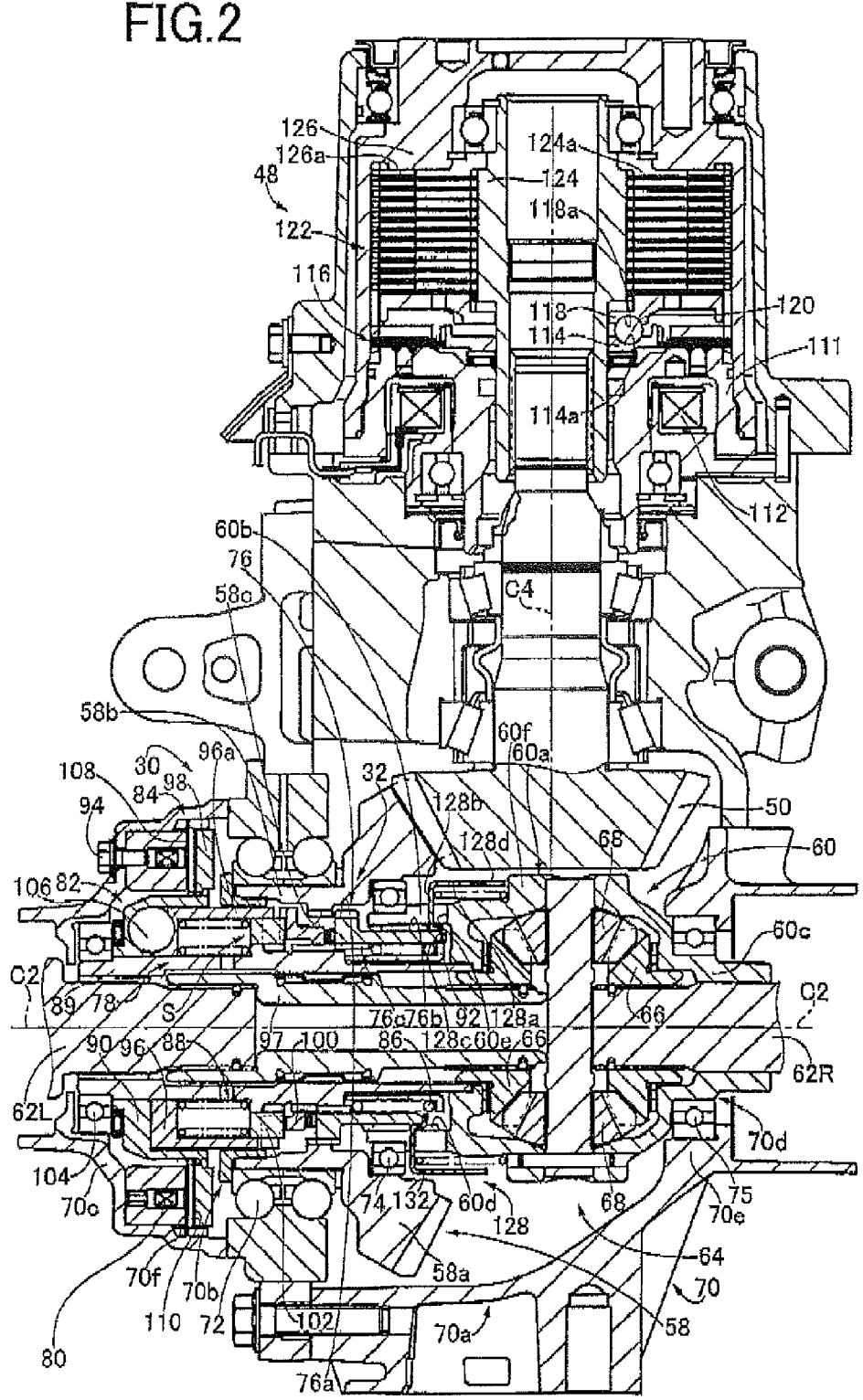
FIG. 2 is a cross-sectional view for explaining a configuration of a differential device having a disconnect mechanism provided in the four-wheel drive vehicle of FIG. 1.

As shown in FIG. 2, the rear-wheel differential unit 30 includes a unit case (case) 70 housing constituent components making up the rear-wheel differential unit 30, such as the second clutch 32, the cylindrical ring gear 58, and the differential gear device 64. The unit case 70 includes a case member 70a covering most of the constituent components of the rear-wheel differential unit 30, such as the second clutch 32, the ring gear 58, and the differential gear device 64, and a cover member 70c closing an opening portion 70b formed at an end of the case member 70a closer to the rear wheel 16L in a rotation axis C2 direction, and the case member 70a and the cover member 70c are integrally fastened by for example, a fastening member such as a bolt not shown.

Figure 3:
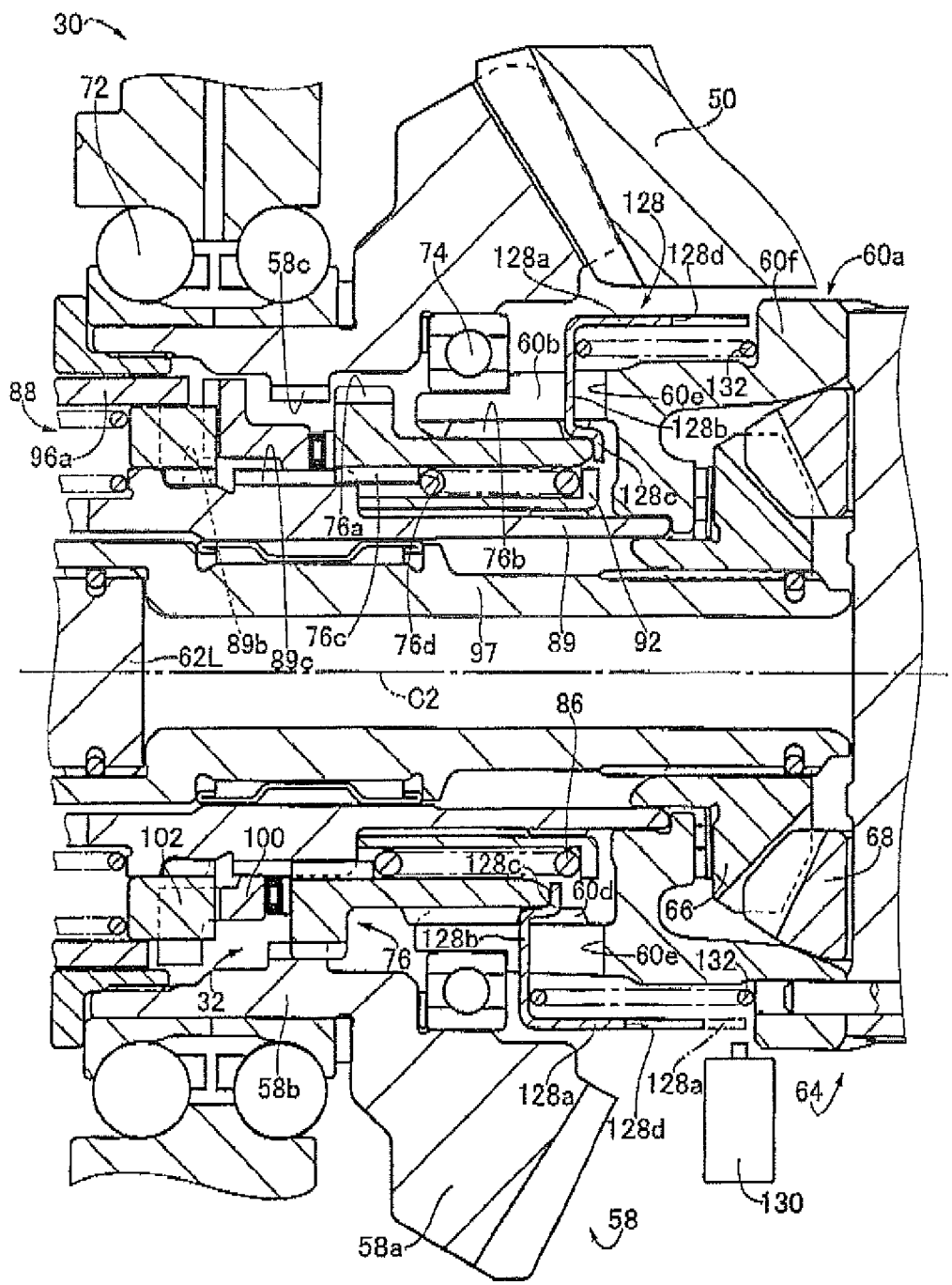
FIG. 3 is an enlarged view of FIG. 2 for explaining a pulse rotor and a rotation sensor provided in the differential device shown in FIG. 2.

As shown in FIGS. 2 and 3, the cylindrical ring gear 58 is a bevel gear provided with helical teeth or hypoid teeth, for example. The ring gear 58 is provided with a cylindrical portion 58b cylindrically and integrally projecting from an inner circumferential portion of a gear portion 58a of the ring gear 58 toward the rear wheel 16L. The ring gear 58 is supported rotatably around the rotation axis C2 in a cantilever state because the cylindrical portion 58b is supported by the unit case 70 via a first bearing 72 attached to the case member 70a of the unit case 70. The cylindrical portion 58b of the ring gear 58 has inner circumferential meshing teeth (inner circumferential teeth) 58c integrally formed on the inner circumferential side of the cylindrical portion 58b.

Figure 4:
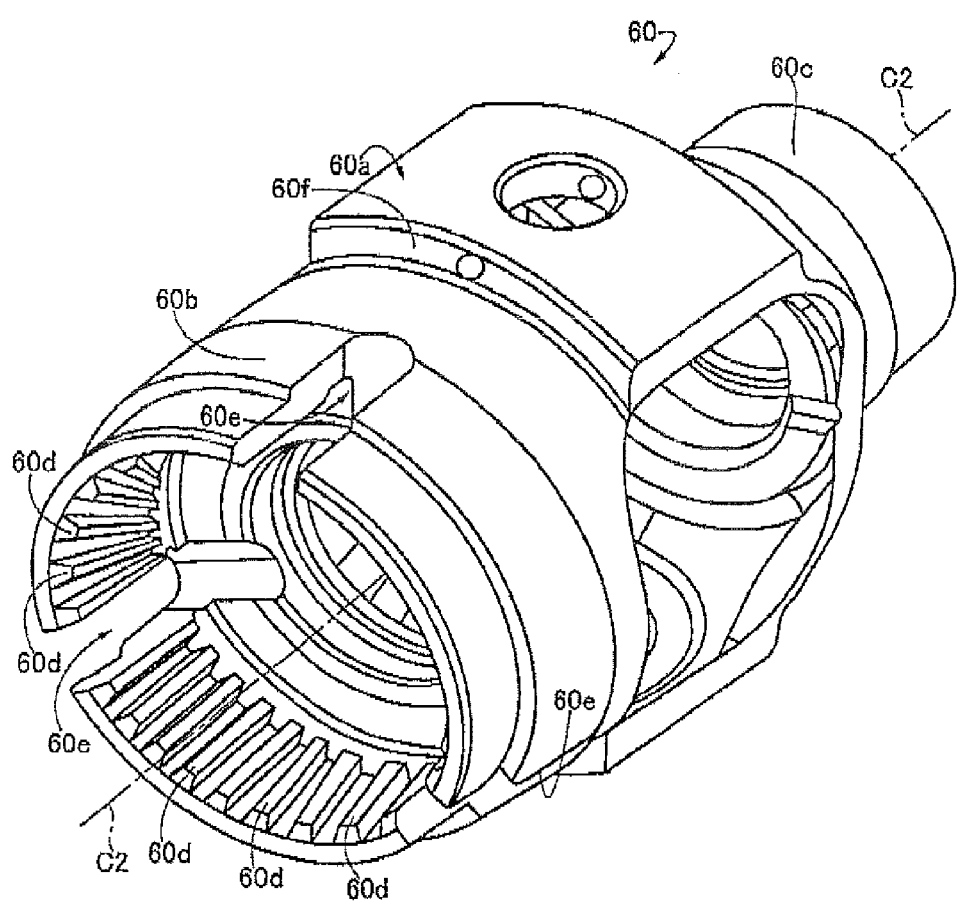
FIG. 4 is a perspective view of a differential case provided in the differential device shown in FIG. 2.

As shown in FIGS. 2 to 4, the differential case 60 integrally includes a case body 60a housing the pair of the side gears 66 and the pair of the pinions 68 each in a rotatable manner, a first projecting portion (one end portion) 60b cylindrically projected from an end portion of the case body 60a closer to the rear wheel 16L in the direction of the rotation axis C2 of the ring gear 58 toward the rear wheel 16L, in the direction of the rotation axis C2, and a second projecting portion (the other end portion) 60c cylindrically projected from an end portion of the case body 60a closer to the rear wheel 16R in the direction of the rotation axis C2 of the ring gear 58 toward the rear wheel 16R in the direction of the rotation axis C2. As shown in FIG. 2, for the differential case 60, a second bearing 74 is disposed between the first projecting portion 60b of the differential case 60 and the gear portion 58a of the ring gear 58, and a second bearing 75 is disposed between the second projecting portion 60c of the differential case 60 and a circumferential edge portion 70e of an opening portion 70d formed at an end portion of the case member 70a closer to the rear wheel 16R in the rotation axis C2 direction. As a result, the differential case 60 has the first projecting portion 60b of the differential case 60 supported via the second bearing 74 by the ring gear 58 and the second projecting portion 60c of the differential case 60 supported via the second bearing 75 by the case member 70a of the unit case 70 rotatably and concentrically with the rotation axis C2 of the ring gear 58. The first projecting portion 60b formed on the differential case 60 is provided with a plurality of inner circumferential spline teeth 60d formed on an inner circumferential surface of the first projecting portion 60b, and cutouts 60e cut in the rotation axis C2 direction at multiple circumferential positions (three positions in this example) of the first projecting portion 60b.

As shown in FIG. 2, in the rear-wheel differential unit 30, the ring gear 58 supporting the first projecting portion 60b of the differential case 60 is located closer to the rear wheel 16L relative to a rotation axis C4 of the drive pinion 50, and the circumferential edge portion 70e of the opening portion 70d of the case member 70a supporting the second projecting portion 60c of the differential case 60 is located on the side opposite to the rear wheel 16L relative to the rotation axis C4 of the drive pinion 50. Therefore, as compared to a rear-wheel differential unit having, for example, the first projecting portion 60b and the second projecting portion 60c of the differential case 60 supported by the unit case 70, i.e., having the first projecting portion 60b of the differential case 60 supported by the circumferential edge portion 70c of the case member 70a of the unit case 70, the differential case 60, i.e., the differential gear device 64 is located close to the ring gear 58, i.e., the rotation axis C4 of the drive pinion 50, in the rotation axis C2 direction in the rear-wheel differential unit 30.

As shown in FIGS. 2 and 3, the second clutch 12 includes the inner circumferential meshing teeth 58c formed on the ring gear 58 and a cylindrical movable sleeve (sleeve) 76 provided with outer circumferential meshing teeth (outer circumferential teeth) 76a capable of meshing with the inner circumferential meshing teeth 58c. The movable sleeve 76 is formed into a cylindrical shape and the cylindrical movable sleeve 76 is provided in or circumferential meshing teeth 76a formed on an outer circumferential surface of an end portion of the movable sleeve 76 closer to the rear wheel 16L, a plurality of outer circumferential spline teeth 76b formed on an outer circumferential surface of an end portion on the side opposite to the outer circumferential meshing teeth 76a, and a plurality of inner circumferential spline teeth 76c formed on an inner circumferential surface of the end portion of the movable sleeve 76 closer to the rear wheel 16L. The movable sleeve 76 has the outer circumferential spline teeth 76b of the movable sleeve 76 fitted to the inner circumferential spline teeth 60d of the first projecting portion 60b of the differential case 60 and is disposed on the inner circumferential side of the first projecting portion 60b of the differential case 60 movably in the rotation axis C2 direction such that power can be transmitted to the differential case 60. In the second clutch 32, when the inner circumferential meshing teeth 58c formed integrally on the ring gear 58 are engaged, i.e., meshed, with the outer circumferential meshing teeth 76a formed integrally on the movable sleeve 76, the drive force transmitted from the engine 12 to the ring gear 58 is output to the rear wheels 16.

As shown in FIGS. 2 and 3, the rear-wheel differential unit 30 includes a second actuator (actuator) 80 driving the movable sleeve 76 via a thrust transmission mechanism 78. The second actuator 80 drives the movable sleeve 76 via the thrust transmission mechanism 78 between a connected position (engagement position) and a disconnected position (release position). The connected position is an engagement position, a meshing position, at which the outer circumferential meshing teeth 76a of the movable sleeve 76 are engaged with the inner circumferential meshing teeth 58c of the ring gear 58 when the movable sleeve 76 moves in the rotation axis C2 direction, and at the connected position, the ring gear 58 and the differential case 60 cannot relatively rotate. The disconnected position is a release position, i.e., a non-meshing position, at which the outer circumferential meshing teeth 76a of the movable sleeve 76 are not engaged with the circumferential meshing teeth 58c of the ring gear 58 when the movable sleeve 76 moves in the rotation axis C2 direction, and at the disconnected position, the ring gear 58 and the differential case 60 can relatively rotate. In the two-wheel drive state with the first clutch 24 released, the movable sleeve 76 is moved to the disconnected position by the second actuator 80 via the thrust transmission mechanism 78 and the second clutch 32 is released between the propeller shaft 28 and the rear wheels 16L, 16R, i.e., between the ring gear 58 and the differential case 60, which restrains the propeller shaft 28 etc., from being rotationally driven by the left and right rear wheels 16L, 16R, resulting in a reduction in the running resistance of the vehicle due to rotational resistance of the propeller shaft 28 etc. In this example, the second clutch 32 corresponds to a disconnect mechanism, i.e., a connection-disconnection mechanism, and the rear-wheel differential unit 30 including the second clutch 32 is a differential device having a disconnect mechanism.

The thrust transmission mechanism 78 includes a ball cam 82, an auxiliary clutch 84, a spring 86, and a ratchet mechanism (lock-release mechanism) 88. The ball cam 82 is a device converting a rotational force transmitted from the rear wheels 16 into a thrust force in the rotation axis C2 direction, i.e., a device generating the thrust force in the rotation axis C2 direction from the rotational force transmitted from the rear wheels 16, when the second actuator 80 generates a rotation braking torque in an annular second cage 90 described later via the auxiliary clutch 84. The ratchet mechanism 88 transmits the thrust force in the rotation axis C2 direction generated by the ball cam 82 to the movable sleeve 76, thereby moving the movable sleeve 76 and holding the movement position of the movable sleeve 76. The spring 86 is interposed between a stopper 92 integrally fixed to a cylindrical member 89 described later and end surfaces 76d of the inner circumferential spline teeth 76c of the movable sleeve 76 closer to the rear wheel 16R, so as to bias the movable sleeve 76 from the disconnected position toward the connected position, i.e., to bias the movable sleeve 76 in the rotation axis C2 direction toward the rear wheel 16L. The second actuator 80 included in the rear-wheel differential unit 30 is an electromagnetic coil generating the rotation braking torque in the auxiliary clutch 84 and is integrally fixed to the cover member 70c of the unit case 70 by a fastening member such as a fastening bolt 94, for example. Therefore, when the second actuator 80 generates the rotation braking torque in the auxiliary clutch 84 in the thrust transmission mechanism 78, the rotation braking torque is applied to the second cage 90 and the ball cam 82 converts and amplifies the rotational force transmitted from the rear wheels 16 into a thrust force in the rotation axis C2 direction. As a result, the thrust force is transmitted from a first cage 96 of the ball cam 82 via the ratchet mechanism 88 to the movable sleeve 76, and the movable sleeve 76 is moved in the rotation axis C2 direction against the biasing force of the spring 86.

Figure 6:
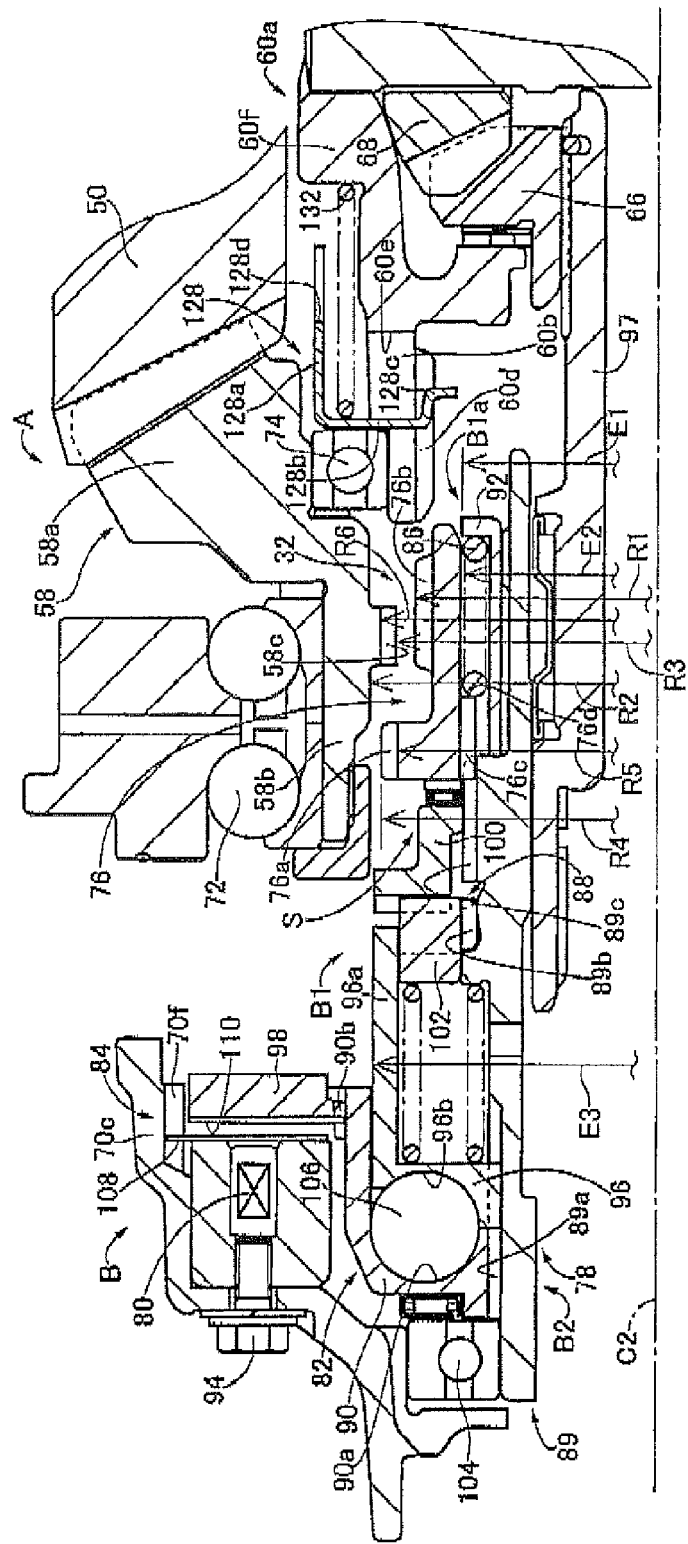
FIG. 6 is a cross-sectional view of a state in which a body portion of the differential device having integrally assembled constituent components such as a ring gear is assembled with a sub-assy of the differential device having integrally assembled constituent components such as a sleeve, the thrust transmission mechanism, and an actuator.

As shown in FIG. 6, the cylindrical member 89 has a cylindrical shape and is disposed between the thrust transmission mechanism 78/the movable sleeve 76 and a rotation shaft 97 described later/a portion of the axle 62L. The cylindrical member 89 includes a plurality of first outer circumferential spline teeth 89a formed at an end portion of the cylindrical member 89 closer to the rear wheel 16L, a plurality of second outer circumferential spline teeth 89b formed at a center portion of the cylindrical member 89, and a plurality of third outer circumferential spline teeth 89c disposed closer to the rear wheel 16R as compared to the second outer circumferential spline teeth 89b and constantly meshed with the inner circumferential spline teeth 76c of the movable sleeve 76. A third beating 104 is disposed between the end portion of the cylindrical member 89 closer to the rear wheel 16L and the cover member 70c, and the cylindrical member 89 is supported rotatably around the rotation axis C2 via the third bearing 104 by the cover member 70c.

As shown in FIG. 6, the rotation shaft 97 is a member of a cylindrical shape rotating integrally with the axle 62L. A portion of the thrust transmission mechanism 78, i.e., a portion of the ratchet mechanism 88 and the spring 86 are disposed in a radial space S between the ring gear 58 and the rotation shaft 97.

The ratchet mechanism 88 includes an annular first piston 96a reciprocated in the rotation axis C2 direction by a predetermined stroke via the ball cam 82 by the electromagnetic coil acting as the second actuator 80 attracting a disk-shaped movable piece 98, an annular second piston 100 disposed rotatably relative to the cylindrical member 89 and moved in the rotation axis C2 direction against the biasing force of the spring 86 by the first piston 96a, and an annular holder 102 having locking teeth 102a (see FIGS. 5A to 5E) and disposed non-rotatably relative to the cylindrical member 89 and unmovably in the rotation axis C2 direction so as to lock the second piston 100 moved by the first piston 96a with the locking teeth 102a. In the ratchet mechanism 88, when the first piston 96a is reciprocated in the rotation axis C2 direction, the movable sleeve 76 is moved by the second piston 100 to the disconnected position against the biasing force of the spring 86, and the second piston 100 is locked to the locking teeth 102a of the holder 102. When the first piston 96a is further reciprocated in the rotation axis C2 direction, the second piston 100 is disengaged from the locking teeth 102a of the holder 102 and the movable sleeve 76 is moved to the connected position in accordance with the biasing force of the spring 86. As shown in FIG. 2, the first cage 96 of the ball cam 82 is integrally disposed with the first piston 96a of the ratchet mechanism 88, and the ratchet mechanism 88 is located between the second cage 90 of the ball earn 82 and the movable sleeve 76.

The ball cam 82 has a pair of the annular first and second cages 96 and 90 inserted and overlapped in the rotation axis C2 direction between the first piston 96a of the ratchet mechanism 88 and the third bearing 104, and a plurality of (e.g., three) spherical rolling bodies 106 sandwiched by pairs of groove-shaped cam surfaces 96b, 90a facing each other formed at a plurality of (e.g., three) circumferential positions in the first and second cages 96 and 90 such that a depth changes in the circumferential direction and, when the first and second cages 96 and 90 are relatively rotated, the first and second cages 96 and 90 are separated away from each other in the rotation axis C2 direction. Therefore, when the first piston 96a is reciprocated by the ball cam 82 once toward the rear wheel 16R and the rear wheel 16L in the rotation axis C2 direction, the movable sleeve 76 is moved via the ratchet mechanism 88 to the disconnected position against the biasing force of the spring 86 as shown by the rear-wheel differential unit 30 on the upper side, i.e., on the side closer to the engine 12, relative to the rotation axis C2 shown in FIG. 2. The meshing is released between the outer circumferential meshing teeth 76a of the movable sleeve 76 and the inner circumferential meshing teeth 58c of the ring gear 58, and the second clutch 32 is released. When the first piston 96a is reciprocated by the ball cam 82 twice, i.e., when the first piston 96a is further reciprocated once while the movable sleeve 76 is located at the disconnected position, the second piston 100 is disengaged from the locking teeth 102a of the holder 102 and the movable sleeve 76 is moved to the connected position by the biasing force of the spring 86 as shown by the rear-wheel differential unit 30 on the lower side, i.e., on the side opposite to the engine 12, relative to the rotation axis C2 shown in FIG. 2. As a result, the outer circumferential meshing teeth 76a of the movable sleeve 76 and the inner circumferential meshing teeth 58c of the ring gear 58 are meshed and the second clutch 32 is engaged.

As shown in detail in FIG. 6, between the electromagnetic coil acting as the second actuator 80 and the movable piece 98, the auxiliary clutch 84 is included that has a disk-shaped first friction plate 108 located between the electromagnetic coil and the movable piece 98 and engaged non-rotatably around the rotation axis C2 and movably in the rotation axis C2 direction with inner circumferential spline teeth 70f formed on the cover member 70c of the unit case 70 as well as a disk-shaped second friction plate 110 located between the first friction plate 108 and the movable piece 98 and engaged non-rotatably around the rotation axis C2 and movably in the rotation axis C2 direction with outer circumferential spline teeth 90b formed on the second cage 90. The concave groove-shaped cam surfaces 96b, 90a formed at a plurality of circumferential positions between the annular first cage 96 and the annular second cage 90 are sloped such that a distance between the cam surfaces 96b, 90a in the rotation axis C2 direction is reduced along the circumferential direction. The first cage 96 is engaged relatively non-rotatably and movably in the rotation axis C2 direction with the cylindrical member 89.

With regard to the electromagnetic coil acting as the second actuator 80 and the thrust transmission mechanism 78 configured as described above, for example, when the movable piece 98 is attracted by the electromagnetic coil while the cylindrical member 89 is rotating during running of the vehicle, the first friction plate 108 and the second friction plate 110 are sandwiched and pressed by the movable piece 98 between the movable piece 98 and the electromagnetic coil and the rotation braking torque is transmitted to the second friction plate 110. In other words, when the movable piece 98 is attracted by the electromagnetic coil, the rotation braking torque is transmitted via the second friction plate 110 of the auxiliary clutch 84 to the second cage 90. Therefore, the first cage 96 and the second cage 90 are relatively rotated by the rotation braking torque, and the first piston 96a integrally formed on the first cage 96 moves toward the rear wheel 16R against the biasing force of the spring 86 in the rotation axis C2 direction relative to the second cage 90 via the spherical rolling bodies 106, so that the rotational force of the cylindrical member 89 rotated by the drive force transmitted from the rear wheels 16 is converted into the thrust force in the rotation axis C2 direction. When the movable piece 98 is not attracted by the electromagnetic coil, since the second cage 90 can rotate relatively to the cover member 70c of the unit case 70, the second cage 90 rotates together with the first cage 96 via the spherical rolling bodies 106 so that the second cage 90 and the first cage 96 integrally rotate. This terminates the reciprocation of the first piston 96a in the rotation axis C2 direction. In the rear-wheel differential unit 30, the third outer circumferential spline teeth 89d formed on the cylindrical member 89 are constantly meshed with the inner circumferential spline teeth 76c formed on the movable sleeve 76, and the outer circumferential spline teeth 76b formed on the movable sleeve 76 are constantly meshed with the inner circumferential spline teeth 60d formed on the first projecting portion 60b of the differential case 60. Therefore, during running of the vehicle, the rotational force input from the rear wheels 16 is transmitted via the axle 62L, the differential case 60, the movable sleeve 76, etc. to the cylindrical member 89, and the cylindrical member 89 is rotated around the rotation axis C2.

FIGS. 5A to 5E are schematic diagrams for explaining an operation principle of the ratchet mechanism 88 and shows each of the annular first piston 96a, the annular second piston 100, and the annular holder 102 in a developed state. As described above, the ratchet mechanism 88 includes the annular first piston 96a, the annular second piston 100, and the annular holder 102 and acts as a locking mechanism. The annular second piston 100 is provided with a projection 100a projected toward the holder 102. The annular holder 102 has the saw-tooth-shaped locking teeth 102a periodically formed and circumferentially arranged for locking the projection 100a of the second piston 100, and the holder 102 is disposed at a fixed position on the cylindrical member 89. The annular first piston 96a has receiving teeth 96d periodically formed and circumferentially arranged in the same sa-w-tooth shape as the locking teeth 102a of the holder 102 shifted by a half of a phase for receiving the projection 100a of the second piston 100. The annular first piston 96a is disposed non-rotatably relatively to the holder 102 and movably in the rotation axis C2 direction and can move the second piston 100 by one stroke of the ball cam 82 against the biasing force of the spring 86. Slopes at the tips of the receiving teeth 96d of the first piston 96a and the locking teeth 102a of the holder 102 are provided with stoppers 96e and 102b, respectively, preventing the projection 100a from slipping.

Figure 5A:
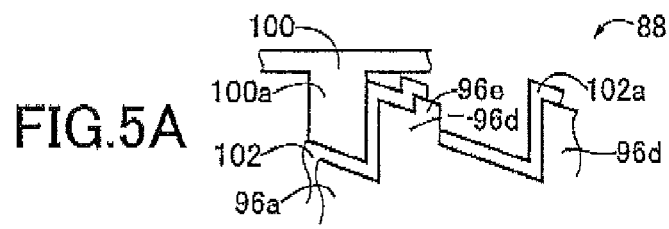
FIGS. 5A to 5B are diagrams for explaining a ratchet mechanism of a thrust transmission mechanism provided in the differential device shown in FIG. 2.
Figure 5B:
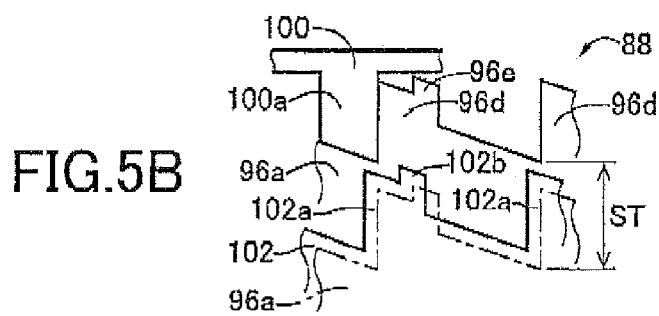
Figure 5C:
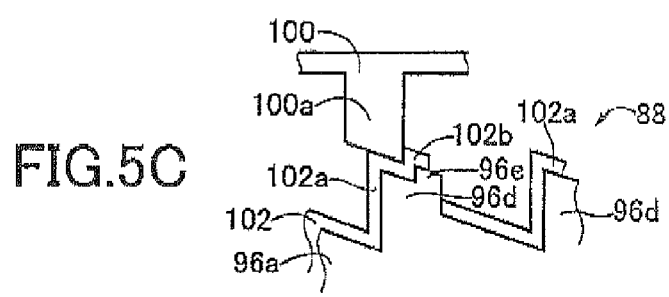
Figure 5D:
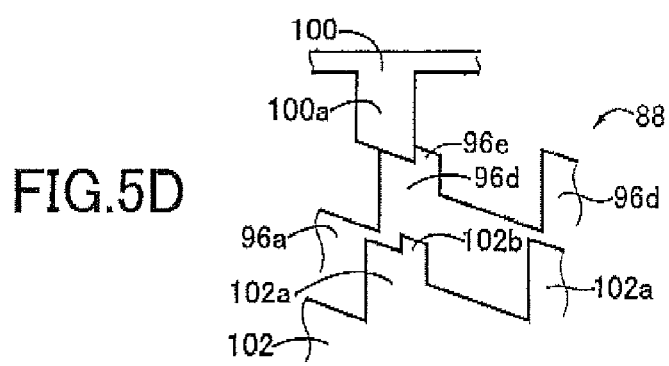
Figure 5E:
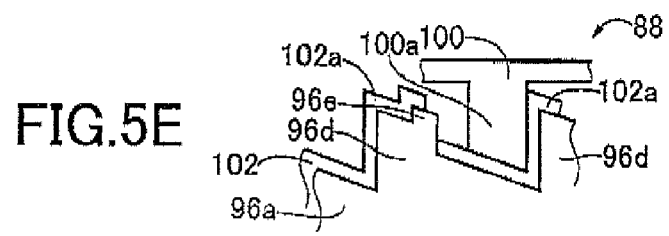

In FIGS. 5A and 5E, the movable sleeve 76 is located at the connected position. As shown in FIGS. 5A and 5E, while the projection 100a projected from the second piston 100 is positioned at a position locked by the locking teeth 102a of the holder 102, the first piston 96a is positioned at a base position thereof. In FIG. 5B, the first piston 96a is moved from the base position against the biasing force of the spring 86 by a movement stroke ST due to actuation of the second actuator 80 and the ball cam 82. In this process, the second piston 100 is moved away from the holder 102 by the first piston 96a and the second piston 100 slides down the slope of the first piston 96a. The dashed-dotted line shown in FIG. 5B indicates the original position of the first piston 96a in FIG. 5A for explaining the movement stroke ST. In FIG. 5C, the first piston 96a is returned by the movement stroke ST in accordance with the biasing force of the spring 86 due to non-actuation of the second actuator 80 and the ball cam 82 and is positioned at the base position. In this process, the second piston 100 is locked on the locking teeth 102a of the holder 102 and is held at the disconnected position. In FIG. 5D, the first piston 96a is moved again from the base position against the biasing force of the spring 86 by the movement stroke ST due to actuation of the second actuator 80 and the ball cam 82. In this process, the second piston 100 is further moved toward the spring 86. Subsequently, when the first piston 96a is returned by the movement stroke ST in accordance with the biasing force of the spring 86 due to non-actuation of the second actuator 80 and the ball cam 82 and is positioned at the base position as shown in FIG. 5E, the second piston 100 is positioned at the connected position, so that the inner circumferential meshing teeth 58c of the ring gear 58 are meshed with the outer circumferential meshing teeth 76a of the movable sleeve 76.

Therefore, the ratchet mechanism 88 allows the reciprocation of the first piston 96a due to the ball cam 82 to send the second piston 100 in the circumferential direction so that the movable sleeve 76 is moved to the disconnected position or the connected position. When the second piston 100 is reciprocated once, the movable sleeve 76 is positioned at the disconnected position. When the second piston 100 is reciprocated twice, i.e., when the second piston 100 is further reciprocated once while the movable sleeve 76 is located at the disconnected position, the second piston 100 is disengaged from the locking teeth 102a of the holder 102 and the movable sleeve 76 is positioned at the connected position by the biasing force of the spring 86.

As shown in FIG. 2, the coupling 48 includes an annular electromagnet 112 fixed at a fixed position to a case 111 that is a non-rotating member housing the coupling 48, an auxiliary friction engagement device 116 generating a friction torque in an auxiliary pressing member 114 from a magnetic force generated in the electromagnet 112, a main pressing member 118 sandwiching a spherical rolling body 120 in inclined concave grooves 114a, 118a with the auxiliary pressing member 114, and a main friction engagement device 122 receiving a thrust force generated by rotation of the auxiliary pressing member 114 relative to the main pressing member 118 to generate the friction torque. The main friction engagement device 122 includes a clutch hub 124 relatively non-rotatably coupled to the drive pinion 50, a clutch drum 126 relatively non-rotatably coupled to the propeller shaft 28, and alternately overlapped hub-side and drum-side friction plates 124a and 126a relatively non-rotatably mounted on the clutch hub 124 and the clutch drum 126, respectively. As a result, the coupling 48 transmits to the ring gear 58, i.e., toward the rear wheels 16, a transmission torque corresponding to an excitation current (torque command value) supplied to the electromagnet 112 from the electronic control device not shown. Therefore, by controlling the transmission torque of the coupling 48, the torque distribution between the front and rear wheels can continuously be varied between 100:0 and 50:50. The coupling 48 is disposed in series with the propeller shaft 28.

As shown in FIG. 3, the rear-wheel differential unit 30 is provided with a pulse rotor (detection rotor) 128 brought into contact with the movable sleeve 76 and interlocked with the movement of the movable sleeve 76 in the rotation axis C2 direction, and a rotation sensor 130 detecting the movement position of the pulse rotor 128 in the rotation axis C2 direction. The pulse rotor 128 is disposed non-rotatably relative to the differential case 60 and a portion of the pulse rotor 128 is located on the radially outside of the first projecting portion 60b of the differential case 60 through the cutouts 60e formed in the first projecting portion 60b of the differential case 60.

As shown in FIG. 3, the pulse rotor 128 integrally includes a cylindrical portion 128a of a cylindrical shape disposed on the outer circumferential side of the end portion of the case body 60a of the differential case 60 closer to the rear wheel 16L, a bent portion 128b bent from an end portion, of the cylindrical portion 128a closer to the rear wheel 16L through the multiple cutouts 60e formed in the first projecting portion 60b of the differential case 60 in a direction approaching the movable sleeve 76, and a contact portion 128c extended from a loading end portion of the bent portion 128b to come into contact with an end portion of the movable sleeve 76 closer to the rear wheel 16R. The case body 60a of the differential case 60 is provided with a receiving portion 60f receiving one end of a coil-shaped spring 132 described later and the coil-shaped spring 132 is disposed in a compressed state between the receiving portion 60f and the bent portion 128b of the pulse rotor 128. As a result, when the movable sleeve 76 moves in the rotation axis C2 direction, for example, when the movable sleeve 76 moves to the disconnected position, the pulse rotor 128 is pushed by the movable sleeve 76 and moved toward the rear wheel 16R in the rotation axis C2 direction. When the movable sleeve 76 moves to the connected position, the pulse rotor 128 is moved by the biasing force of the spring 132 toward the rear wheel 16L in the rotation axis C2 direction. In particular, the pulse rotor 128 is integrally connected to the movable sleeve 76 and is moved in the rotation axis C2 direction in conjunction with the movement of the movable sleeve 76 in the rotation axis C2 direction. The pulse rotor 128 has the bent portion 128b brought into contact with circumferential edge portions of the multiple cutouts 60e formed in the first projecting portion 60b of the differential case 60, and the pulse rotor 128 is disposed non-rotatably relative to the differential case 60. The cylindrical portion 128a of the pulse rotor 128 may be made of magnetic metal such as steel, for example, and may be provided with a magnetic pole not shown. The cylindrical portion 128a of the pulse rotor 128 is provided with multiple cutouts 128d cut in the rotation axis C2 direction and the multiple cutouts 128d are arranged at regular intervals in the circumferential direction of the cylindrical portion 128a of the pulse rotor 128.

The rotation sensor 130 is, for example, a magnetic sensor that magnetically detects the proximity of the cylindrical portion 128a having the multiple cutouts 128d formed in the circumferential direction without contact and that outputs a signal of the detection to the electronic control device not shown, and is integrally attached by an attachment member not shown to the case member 70a (see FIG. 2) of the unit case 70 that is a non-rotating member, for example. The rotation sensor 130 detects a periodic sine wave signal from the rotation of the pulse rotor 128 having the cylindrical portion 128a with the multiple cutouts 128d formed in the circumferential direction. For example, when the movable sleeve 76 is at the disconnected position, as shown in FIG. 3, the cylindrical portion 128a of the pulse rotor 128 interlocked with the movable sleeve 76 comes closer to the rotation sensor 130 as compared to when the movable sleeve 76 is at the connected position and therefore, a sine wave signal with comparatively large amplitude is detected from the rotation sensor 130. When the movable sleeve 76 is at the connected position, as shown in FIG. 3, the cylindrical portion 128a of the pulse rotor 128 interlocked with the movable sleeve 76 is away from the rotation sensor 130 as compared to when the movable sleeve 76 is at the disconnected position and, therefore, a sine wave signal with comparatively extremely small amplitude or a signal with zero amplitude is detected from the rotation sensor 130. In the pulse rotor 128 shown on the lower side of the rotation axis C2 in FIG. 3, the cylindrical portion 128a shown by a Arched-dotted line indicates the position when the movable sleeve 76 is at the disconnected position and the cylindrical portion 128a shown by a solid line indicates the position when the movable sleeve 76 is at the connected position. The electronic control device executes a binarization process of setting 1 and 0 when the detected sine wave amplitude signal is equal to or greater than a predetermined value set in advance and less than the predetermined value, respectively. Based on the magnitude of amplitude of the pulse signal output from the rotation sensor 130, the electronic control device determines the movement position in the rotation axis C2 direction of the pulse rotor 128 moved in conjunction with the movable sleeve 76, i.e., determines a connection/disconnection state between the outer circumferential meshing teeth 76a of the movable sleeve 76 and the inner circumferential meshing teeth 58c of the ring gear 58. In particular, when the amplitude of the pulse signal output from the rotation sensor 130 is equal to or greater than a predetermined value, the electronic control device determines that the outer circumferential meshing teeth 76a of the movable sleeve 76 are not meshed with the inner circumferential meshing teeth 58c of the ring gear 58, i.e., that the movable sleeve 76 is at the disconnected position. Alternatively, when the amplitude of the pulse signal output from the rotation sensor 130 is smaller than the predetermined value, the electronic control device determines that the outer circumferential meshing teeth 76a of the movable sleeve 76 are meshed with the inner circumferential meshing teeth 58c of the ring gear 58, i.e., that the movable sleeve 76 is at the connected position.

In the four-wheel drive vehicle 10 configured as described above, for example, when a two-wheel running mode is selected in the electronic control device not shown during the four-wheel drive state in which both the first clutch 24 and the second clutch 32 are engaged, the sleeve 54 is moved in the transfer 26 by the first actuator 56 to the non-meshing position to release the first clutch 24, while the movable sleeve 76 is moved in the rear-wheel differential unit 30 via the thrust transmission mechanism 78 by the second actuator 80 to the disconnected position to release the second clutch 32, so as to establish the two-wheel drive state in which the drive force is transmitted from the engine 12 only to the front wheels 14 actin as the main drive wheels. When a four-wheel running mode is selected in the electronic control device not shown during the two-wheel drive state in which both the first clutch 24 and the second clutch 32 are released, the sleeve 54 is moved in the transfer 26 by the first actuator 56 to the meshing position to engage the first clutch 24, while the movable sleeve 76 is moved in the rear-wheel differential unit 30 via the thrust transmission mechanism 78 by the second actuator 80 to the connected position to engage the second clutch 32, so as to establish the four-wheel drive state in which the drive force is transmitted from the engine 12 to the front wheels 14 and the rear wheels 16.

As shown in FIGS. 2 and 6, the rear-wheel differential unit 30 includes a main body portion A of the rear-wheel differential unit 30 having constituent components making up the rear-wheel differential unit 30, for example, the ring gear 58, the differential gear device 64, the first bearing 72, the second bearings 74 and 75, and the rotation shaft 97, integrally assembled to the case member 70a of the unit case 70; and a sub-assy B of the rear-wheel differential unit 30 having constituent components making up the rear-wheel differential unit 30, for example, the movable sleeve 76, the thrust transmission mechanism 78, the second actuator 80, the cylindrical member 89, and the third bearing 104, integrally assembled to the cover member 70c of the unit case 70. The rear-wheel differential unit 30 is manufactured by assembling the sub-assy B of the rear-wheel differential unit 30 to the main body portion A of the rear-wheel differential unit 30.

As shown in FIG. 6, the sub-assy B of the rear-wheel differential unit 30 integrally includes a substantially cylindrical insertion portion B1 inserted into the cylindrical portion 58b of the ring gear 53 located in the opening portion 70b (see FIG. 2) of tide case member 70a (see FIG. 2) not depicted in the main body portion A of the rear-wheel differential unit 30, i.e., into a radial space S between the ring gear 58 and the rotation shaft 97; and an annular portion B2 having an annular shape larger than the outer diameter of the insertion portion B1 and covering the opening portion 70b of the case member 70a of the unit case 70. The insertion portion B1 is formed into a cylindrical shape by assembling the constituent components of the rear-wheel differential unit 30, for example, a portion of the thrust transmission mechanism 78, i.e., the ratchet mechanism 88, a portion of the cylindrical member 89, the stopper 92, the spring 86, and the movable sleeve 76 to each other. The annular portion B2 is formed into an annular shape by assembling the constituent components of the rear-wheel differential unit 30, for example, a portion of the thrust transmission mechanism 78, i.e., the ball can 82 and the auxiliary clutch 84, the third bearing 104, the second actuator 80, and the cover member 70c of the unit case 70 to each other. As shown in FIGS. 3 and 6, the insertion portion B1 has a leading end portion provided with a cylindrical passing portion B1a including constituent components of the sub-assy B, for example, the end portion of the cylindrical member 89 closer to the rear wheel 16L, the stopper 92, the spring 86, and the movable sleeve 76, passing through the inner circumferential meshing teeth 58c of the ring gear 58 in the rotation axis C2 direction at the time of insertion and assembly of the sub-assy B into the Main body portion A.

In the sub-assy B of the rear-wheel differential unit 30, as shown in FIG. 6, the stopper 92 and the spring 86 are formed such that both an outer diameter E1 of the stopper 92 and an outer diameter B2 of the spring 86 become smaller than an addendum circle diameter R3 of the inner circumferential meshing teeth 58c of the ring gear 58. In particular, the outer diameter dimension of the cylindrical passing portion B1a of the sub-assy B except the movable sleeve 76 is less than the diameter dimension of the addendum circle diameter R3 of the inner circumferential meshing teeth 58c of the ring gear 58. The ratchet mechanism 88 is formed such that an outer diameter E3 of the ratchet mechanism 88 becomes smaller than an inner diameter R2 of the cylindrical portion 58b of the ring gear 58. The addendum circle diameter R3 of the inner circumferential meshing teeth 58c of the ring gear 58 is set smaller than an addendum circle diameter R4 of the outer circumferential meshing teeth 76a of the movable sleeve 76 and larger than a dedendum circle diameter (root diameter) R5 of the outer circumferential meshing teeth 76a. A dedendum circle diameter (root diameter) R6 of the inner circumferential meshing teeth 58c of the ring gear 58 is set larger than the addendum circle diameter R4 of the outer circumferential meshing teeth 76a of the movable sleeve 76 and smaller than the inner diameter R2 of the cylindrical portion 58b of the ring gear 58. Therefore, the constituent components making up the insertion portion B1 of the sub-assy B inserted into the cylindrical portion 58b of the ring gear 58, for example, the stopper 92, the spring 86, the movable sleeve 76, and the ratchet mechanism 88 have an outer diameter less than the inner diameter of the cylindrical portion 58b of the ring gear 58.

Thus, as shown in FIG. 6, the insertion portion B1 of the sub-assy B of the rear-wheel differential unit 30 has the constituent components making up the insertion portion B1 of the sub-assy B formed into a shape that can be inserted and assembled into the cylindrical portion 58b of the ring gear 58 from the opening portion 70b opened at one end of the case member 70a in the main body portion A of the rear-wheel differential unit 30.

As described above, the rear-wheel differential unit 30 of this example includes the movable sleeve 76 fitted movably in the rotation axis C2 direction in a power transmittable manner on the inner circumferential side of the first projecting portion 60b of the differential case 60 and disposed movably in the rotation axis C2 direction and the second actuator 80 driving the movable sleeve 76 via the thrust transmission mechanism 78 between the connected position at which the outer circumferential meshing teeth 76a formed on the movable sleeve 76 are meshed with the inner circumferential meshing teeth 58c formed on the inner circumferential side of the ring gear 58 and the disconnected position at which the teeth 76a and the teeth 58c are not meshed, and at least a portion of the thrust transmission mechanism 78 is located in the radial space S between the ring gear 58 and the rotation shaft 97. Therefore, during a disconnected state in which the propeller shaft 28 is separated from the rear wheels 16 during the two-wheel drive state, the second actuator 80 moves the outer circumferential meshing teeth 76a of the movable sleeve 76 to the disconnected position at which the teeth 76a are not meshed with the inner circumferential meshing teeth 58c formed on the inner circumferential side of the ring gear 58 so as to separate the power transmission path between the ring gear 58 and the differential case 60 and, therefore, the fully differential state of the differential gear device 64 is prevented during the disconnected state and the disconnect effect of separating the propeller shaft 28 from the rear wheels 16 is enhanced as compared to a differential device using a conventional control coupling (multiplate clutch). The movable sleeve 76 can be inserted through the inside of the radial space S between the ring gear 58 and the rotation shaft 97 and fitted on the inner circumferential side of the first projecting portion 60b of the differential case 60. As a result, since the sub-assy B having the movable sleeve 76, the thrust transmission mechanism 78, and the second actuator 80 integrally assembled can be assembled to the main body portion A of the rear-wheel differential unit 30 having the constituent components such as the ring gear 58 integrally assembled, the constituent components of the rear-wheel differential unit 30 such as the movable sleeve 76 and the second actuator 80 can be assembled into a sub-assy. Since the differential case 60 has the first projecting portion 60b supported by the ring gear 58 and the second projecting portion 60c supported by the unit case 70 rotatably and concentrically with the rotation axis C2, the differential case 60 is located closer to the ring gear 58 as compared to a rear-wheel differential unit having, for example, the first projecting portion 60b and the second projecting portion 60c supported by the unit case 70 rotatably and concentrically with the rotation axis C2 in the rotation axis C2 direction, and the size of the rear-wheel differential unit 30 is made smaller in the rotation axis C2 direction as compared to the conventional cases, so that the rear-wheel differential unit 30 can be reduced in size.

According to the rear-wheel differential unit 30 of this example, the cutouts 60e cut in the rotation axis C2 direction are formed in the first projecting portion 60b of the differential case 60, and the pulse rotor 128 brought into contact with the movable sleeve 76 and interlocked with the movement of the movable sleeve 76 in the rotation axis C2 direction is disposed non-rotatably relative to the differential case 60 with a portion of the pulse rotor 128 located on the radially outside of the first projecting portion 60b of the differential case 60 through the cutouts 60e. Therefore, since the movement of the movable sleeve 76 disposed on the inner circumferential side of the ring gear 58 and the inner circumferential side of the first projecting portion 60b of the differential case 60 moves the pulse rotor 128 disposed on the radially outside of the first projecting portion 60b of the differential case 60 in the rotation axis C2 direction, the connection/disconnection state between the outer circumferential meshing teeth 76a of the movable sleeve 76 and the inner circumferential meshing teeth 58c of the ring gear 58 is detected by detecting the position of the pulse rotor 128 in the rotation axis C2 direction.

The rear-wheel differential unit 30 of this example is provided with the rotation sensor 130 detecting the movement position of the pulse rotor 128 in the rotation axis C2 direction, and the connection/disconnection state between the outer circumferential meshing teeth 76a of the movable sleeve 76 and the inner circumferential meshing teeth 58c of the ring gear 58 is determined based on the amplitude of the pulse signal output from the rotation sensor 130. Therefore, in the movable sleeve 76 disposed on the inner circumferential side of the ring gear 58 and the inner circumferential side of the first projecting portion 60b of the differential case 60, the connection/disconnection state between the outer circumferential meshing teeth 76a of the movable sleeve 76 and the inner circumferential meshing teeth 58c of the ring gear 58 can be determined by using the highly-reliable rotation sensor 130.

Although the example of the present invention has been described in detail with reference to the drawings, the present invention can be applied in other forms.

For example, although the four-wheel drive vehicle 10 in the example is an FF-based vehicle including the rear-wheel differential unit 30, the present invention can appropriately be combined and implemented with FR-based vehicles, RR-based vehicles, etc. In the case of FR-based and RR-based vehicles, a differential unit having the same configuration as the rear-wheel differential unit 30 is used for the front wheels.

In the rear-wheel differential unit 30 of the example, the thrust transmission mechanism 78 includes the ball cam 82 and the ratchet mechanism 88 actuating the second piston 100 by a stroke larger than the actuation stroke of the movable piece 98 attracted by the electromagnetic coil acting as the second actuator 80. However, for example, an electromagnetic actuator, a motor, or a hydraulic cylinder having a larger actuation stroke may be used as an actuator instead of the second actuator 80 that is the electromagnetic coil, and the second piston 100 can be moved by the actuator. In this case, the ball earn 82 and the ratchet mechanism 88 are not required for the thrust transmission mechanism 78. Although the ratchet mechanism 88 has one stage of the receiving teeth 96d of the first piston 96a and one stage of the locking teeth 102a of the holder 102, the number of the stages may be two or more, for example. In particular, when the first piston 96a is reciprocated a predetermined number of times, for example, twice or more in the ratchet mechanism 88, the second piston 100 may move the movable sleeve 76 to the disconnected position against the biasing force of the spring 86 and, when the number of times of the reciprocation of the first piston 96a exceeds the predetermined number of times, the second piston 100 may be disengaged from the locking teeth of the holder 102 and the movable sleeve 76 may be moved to the connected position in accordance with the biasing force of the spring 86.

In the rear-wheel differential unit 30 of the example, the axle 62L is provided with the rotation shaft 97 rotating integrally with the axle 62L, and a portion of the thrust transmission mechanism 78 is located in the radial space S between the rotation shaft 97 and the ring gear 58. However, the axle 62L may not be provided with the rotation shaft 97 and may be extended to couple to the side gear 66, and a portion of the thrust transmission mechanism 78 may be located in a radial space between the extended axle 62L and the ring gear 58. Alternatively, the entire thrust transmission mechanism 78 may be located in the radial space S between the rotation shaft 97 or the axle 62L and the ring gear 58.

The above description is merely an embodiment and the present invention may be implemented in variously modified and improved forms based on the knowledge of those skilled in the art.

NOMENCLATURE OF REFERENCE SIGNS

10: four-wheel drive vehicle
12: engine (drive power force)
14: front wheels (main drive wheels)
16: rear wheels (auxiliary drive wheels)
28: propeller shaft (power transmission member)
30: rear-wheel differential unit (differential device)
58: ring gear
58c: inner circumferential meshing teeth (inner circumferential teeth)
60: differential case
60b: first projecting portion (one end portion)
60c: second projecting portion (the other end portion)
60e: cutouts
62L: axle
70: unit case (case)
76: movable sleeve (sleeve)
76a: outer circumferential meshing teeth (outer circumferential teeth)
78: thrust transmission mechanism
80: second actuator (actuator)
97: rotation shaft
128: pulse rotor (detection rotor)
130: rotation sensor
C2: rotation axis
S: space

The invention claimed is:

1. A differential device of a four-wheel drive vehicle which is operated in selected one of a two-wheel drive state in which a drive force from a drive power source is transmitted to left and right main drive wheels and a four-wheel drive state in which a drive force from the drive power source is transmitted to said left and right main drive wheels and left and right auxiliary drive wheels, the differential device including a disconnect mechanism with which a power transmission member for transmitting a drive force only to the auxiliary drive wheels in the four-wheel drive state is separated from the auxiliary drive wheels in the two-wheel drive state, the differential device comprising:

a cylindrical ring gear supported rotatably around one rotation axis by a case;

a differential case including one and the other cylindrical end portions in a rotation axis direction of the ring gear and supported at the one end portion by the ring gear and at said the other end portion by the case rotatably and concentrically with the rotation axis;

a sleeve fitted movably in the rotation axis direction in a power transmittable manner on the inner circumferential side of the one end portion of the differential case; and an actuator driving the sleeve via a thrust transmission mechanism between an engagement position at which outer circumferential teeth formed on the sleeve are engaged with inner circumferential teeth formed on the inner circumferential side of the ring gear and a release position at which the teeth are not engaged, the thrust transmission mechanism being at least partially located in a radial space between the ring gear and an axle penetrating the ring gear or a rotation shaft integrally rotating with the axle.

2. The differential device of a four-wheel drive vehicle according to claim 1, wherein a cutout cut in the rotation axis direction is formed in the one end portion of the differential case, and wherein a detection rotor brought into contact with the sleeve and interlocked with movement of the sleeve in the rotation axis direction is disposed non-rotatably relative to the differential case, with a portion of the detection rotor located on the radially outside of the one end portion of the differential case through the cutout.

3. The differential device of a four-wheel drive vehicle according to claim 2, wherein the detection rotor is a pulse rotor, wherein a rotation sensor is disposed such that the rotation sensor detects a movement position of the pulse rotor in the rotation axis direction, and wherein a connection/disconnection state whether the outer circumferential teeth of the sleeve and the inner circumferential teeth of the ring gear are connected or disconnected is determined based on amplitude of an output signal of the rotation sensor.

* * * * *